United States Patent [19]

Beckershoff

[11] 3,986,779
[45] Oct. 19, 1976

[54] LOCKING DEVICE FOR RELEASABLY FASTENING PARTS TO ROTORS OF FLUID FLOW MACHINES

[75] Inventor: Wolfgang Beckershoff, Fislisbach, Switzerland

[73] Assignee: Brown Boveri-Sulzer Turbomaschinen Aktiengesellschaft, Zurich, Switzerland

[22] Filed: May 19, 1975

[21] Appl. No.: 579,276

[30] Foreign Application Priority Data

May 27, 1974 Switzerland.......................... 7208/74

[52] U.S. Cl. ................................ 403/20; 403/318; 403/319; 403/355; 416/221
[51] Int. Cl.² ...................... F16D 1/00; F16B 13/00
[58] Field of Search ............... 403/19, 20, 318, 319, 403/320, 355, 356, 357, 350, 381; 416/215, 220, 221

[56] References Cited

UNITED STATES PATENTS

| 929,234 | 7/1909 | Mather | 403/381 X |
|---|---|---|---|
| 2,801,074 | 7/1957 | Brown | 416/221 |
| 2,847,187 | 8/1958 | Murphy | 416/221 |
| 3,086,697 | 4/1963 | Gardinier et al. | 416/220 |
| 3,360,285 | 12/1967 | Huckshold | 403/355 X |
| 3,567,337 | 3/1971 | Zerlauth et al. | 416/215 X |
| 3,759,633 | 9/1973 | Tournere | 403/381 X |

FOREIGN PATENTS OR APPLICATIONS

| 471,851 | 2/1929 | Germany | 403/355 |
| 826,332 | 12/1951 | Germany | 416/220 |
| 879,345 | 6/1953 | Germany | 416/220 |

*Primary Examiner*—Wayne L. Shedd
*Attorney, Agent, or Firm*—Werner W. Kleeman

[57] ABSTRACT

A locking device for releasably fastening parts to rotors of fluid flow machines, the base portions of the parts to be secured fitting in a form-locking manner in at least approximately axially extending fixing slots provided at the circumference of the rotor, the locking device including fixing elements which can be inserted into depression means extending transversely with respect to the axially extending fixing slots and provided in the rotor and into recesses provided in the base portions of the parts to be secured. The depression means are provided at the region of the axially extending fixing slots and divide the flanks of each such axially extending fixing slot into approximately equal parts and the recesses provided in the base portions of the parts to be secured in the assembled condition of such parts coincide with the depression means. The fixing elements simultaneously engage with both the depression means at the region of the fixing slots and the recesses in the base portions of the parts to be secured to the rotor, and such fixing elements during assembly and disassembly thereof can be removed from either the depression means or the recesses.

14 Claims, 12 Drawing Figures

LOCKING DEVICE FOR RELEASABLY FASTENING PARTS TO ROTORS OF FLUID FLOW MACHINES

BACKGROUND OF THE INVENTION

The present invention relates to a new and improved construction of locking device for releasably fastening or locking desired parts or components to rotors or the like of fluid flow machines, wherein the base portions of the parts to be fastened are inserted in a form-locking or positively secured manner into at least approximately axially extending fixing slots or grooves arranged about the circumference of the rotor or the like, the aforesaid locking device employing fastening or securing elements which can be inserted into depressions provided in the rotor and extending transversely with respect to the axially extending fixing slots and into recesses provided in the base portion of the associated part which is to be fastened to the rotor.

In the context of this disclosure the term "part or component", which is intended to be fixed to a rotor or the like, is employed in its broadest sense as embracing one or more parts which are intended to be secured to a rotor of a machine, typically a fluid flow machine. Equally, the term "rotor" as used in the context of this disclosure is employed in its broader sense to encompass generally an annualr element, such as a rotor or rotatable wheel of such machine. Purely by way of example, and not limitation, the parts to be fastened to the rotor may be constituted by buckets or intermediate elements, wherein the rotor by way of example may be the wheel of a turbine.

The requirements which are generally placed upon locking devices of the aforementioned type as used for securing buckets or intermediate elements at fluid flow machines are that such locking devices can be easily handled and manipulated during the assembly and disassembly operations. Additionally, the locking devices should provide adequate safeguards against becoming damaged or any loss in their locking action during the operating of the machine.

Numerous proposals have already been advanced in the art for different constructional manifestations of such locking or fastening devices. Thus, for instance, there is known to the art securing or fixing devices wherein the fastening elements are inserted into a circumferential groove arranged approximately at the center of the parts which are to be fastened. These fastening elements are arranged at the ends of the teeth or serrations of the rotor disk between the axial slots and such fastening elements surround the base portion or foot of the parts which are to be secured in the axial direction.

Other constructions of securing or fastening devices have become part of the state-of-the-art wherein the fastening elements are likewise inserted into a circumferential groove of the rotor which is arranged at the outer ends of the rotor teeth and only extend over a part of the axial width of the bucket.

Apart from the foregoing there are also known fastening or securing devices which are inserted into the base of the axially extending or axial fixing slot and through the agency of hooks bent from wire or sheet metal, and which hooks engage at the end faces of the base portion of the part to be secured, fixedly hold such part in the axial slot against undesired displacement.

When using heat-resistant material, but also in consideration of other operational or performance data, these fastening devices, for instance when used with gas turbines, have been found to be partially ineffective or technically unsatisfactory. All of these locking or securing systems either are associated with the drawbacks that the last buckets of a row only can be fixed to the rotor with the aid of a special or non-standardized fastening element which in turn itself must be additionally secured, or each fastening element must be specially peened over or bent during the assembly operation. With this locking technique the bucket or the intermediate element or part must be necessarily fixed to the outer surface or end face of the base plate or the base or foot portion. Consequently, there can arise irregular or non-uniform loads, resulting in rupture of the fastening elements inserted between two buckets or that the locking action is no longer exactly and accurately fulfilled.

SUMMARY OF THE INVENTION

With the foregoing in mind, it is a primary object of the present invention to provide a new and improved construction of locking device for securing desired parts to the rotors of fluid flow machines in a manner not associated with the aforementioned drawbacks and limitations of the prior art proposals.

Another and more specific object of the present invention aims at the provision of a novel construction of locking device for the attachment of buckets or intermediate elements to a rotor or the like of a fluid flow machine and which locking device permits of a uniform expansion of the base portion of the part which is to be attached in its associated axial fastening or fixing slot.

Still a further significant object of the present invention is concerned with the provision of a novel locking device for releasably securing desired components to a rotatable element, such as typically a rotor or wheel, of a fluid flow machine, in an extremely quick, reliable and accurate manner, requiring very few and easy to carry out manipulations both for the assembly and disassembly of the relevant component, with the construction of the locking device itself being extremely simple, economical to fabricate and yielding good locking action performance.

Now in order to implement these and still further objects of the invention, which will become more readily apparent as the description proceeds, the locking device of this development is manifested by the features that the depressions at the region of the axial fixing slots or grooves at least sub-divide the flanks thereof into approximately equal parts and the recesses in the base portions of the parts or components which are to be secured coincide with the aforesaid depressions in the assembled condition. Furthermore, the fastening elements in each case simultaneously engage into the depressions at the region of the fixing slots and into the recesses in the base portions of the parts or components to be secured to the rotor and such fastening elements, upon being assembled and disassembled, either can be removed out of the depressions or out of the recesses.

One of the notable advantages of this constructional manifestation of the invention resides in the fact that the profile of each axial fixing slot or groove and the profile of each base portion of the part to be secured possess the same shape or constructional configuration, thereby eliminating the need for the use of special terminal pieces for a row of buckets or intermediate elements and each part or component which is to be secured can be individually exchanged independently of the other parts. Moreover, during the dismantling operation none of the fastening elements are damaged or rendered unusable, since the safeguard against axial displacement is solely insured for by the form-locking or close-fitting shape of the fastening element.

Apart from the foregoing advantages owing to the central arrangement of the fastening element there is additionally realized a complete balancing of the frictional forces. Hence, the fastening element is only loaded by the flow forces and any possibly arising differential force brought about due to the different coefficients of friction, and thus such fastening element can be beneficially dimensioned to be correspondingly smaller and simpler in construction. Furthermore, the fact that simple manipulations are only necessary during the assembly and disassembly work, without the need for carrying out peening or additional adjustment or bending operations, constitutes a further notable advantage of the invention.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
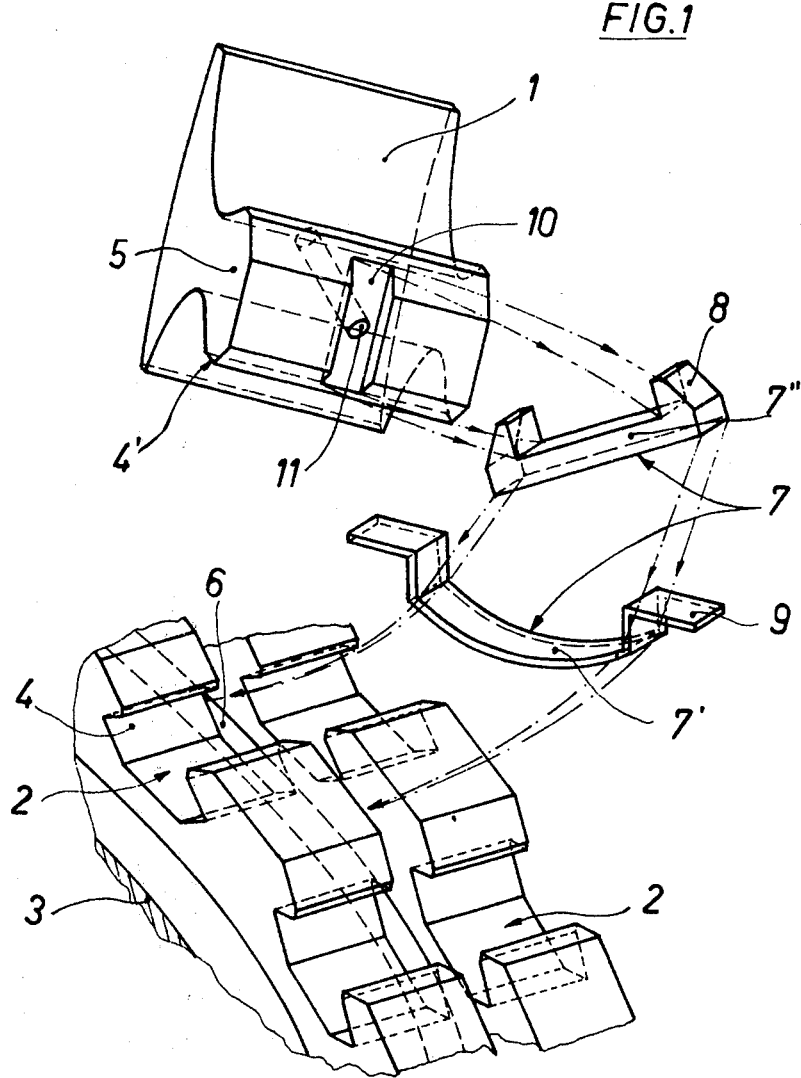
FIG. 1 is an exploded fragementary perspective view of a rotor disk together with an intermediate part or component which is to be connected thereto by means of the locking device of this development.

Various exemplary embodiments of the invention will be described in greater detail hereinafter, and it should be understood that generally throughout the different embodiments the same reference characters have been employed for the same or analogous components. Turning attention to the exemplary embodiment of fastening device as portrayed in FIGS. 1 to 3, the part or component 1 which is to be secured, and in this instance assumed to constitute an intermediate piece or element, is inserted into the associated axially extending fixing slot 2 or a rotor 3 of a fluid flow machine, the flanks 4 of this fixing or fastening slot 2 being undercut, as best seen by referring to FIGS. 1 and 3. It will be recognized from the showing of FIG. 1 that spaced around the circumference of the rotor 3 are a number of such axially extending fixing slots or grooves 2 which are normally of identical construction. The intermediate piece 1 which is to be releasably secured in one of the fixing slots 2 has a base portion or foot 5, the profile of which is shaped at the flanks to complement or match that of the fixing slot 2 into which such intermediate piece or element 1 is to be inserted. A depression or channel 6 in the form of a circumferentially extending slot is provided approximately at the central region of the axial width of the fixing slot 2. Inserted into the depression 6 is a fastening element 7 here shown in the form of a resilient member of spring 7' and a key 7''. At the opposed ends of the key 7'' there are provided projections or nose members 8 which straddle or enclose the base portion 5 of the intermediate piece 1 over its entire profile width, as best seen by referring to FIGS. 2 and 3. At the ends of the spring 7' there are provided self-supporting tongues or flaps 9 which in turn enclose the key 7''. The base or base portion 5 of the intermediate piece 1 is provided at its lower face with a transversely extending or transverse groove 10 providing a form of keyway into which engages the key 7'' i.e. the fastening element after assembling the intermediate piece 1 in the fixing slot 2 or the rotor 3. In order to facilitate the dismantling of the assembled components a bore 11 is conveniently provided at the base portion 5 and which extends continuously through the intermediate piece or element 1, as best seen by referring to FIG. 2. Into this bore there can be conveniently inserted a suitable mounting tool 12, for instance a rod or mandrel, so that the key 7'' can be released from the transverse slot 10 against the force of the spring 7', attention being particularly directed to FIG. 3

Figure 2:
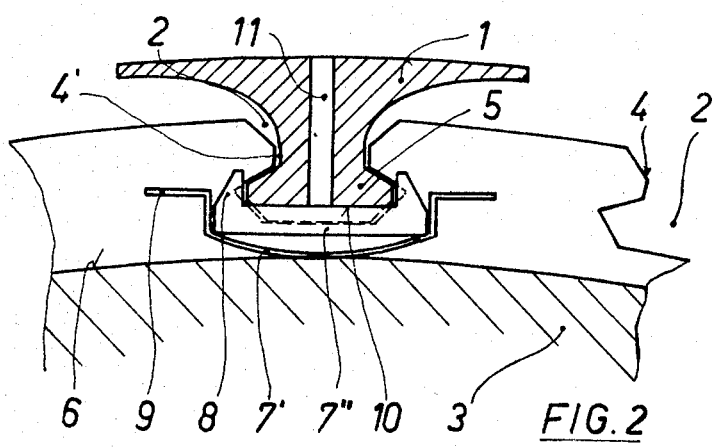
FIG. 2 is a fragmentary radial sectional view through the first exemplary embodiment shown in FIG. 1 and portraying the intermediate part connected by means of the locking device with the rotor disk.

FIG. 2 illustrates a radial sectional view through the fastening device of the embodiment of FIG. 1 with the various parts assembled together. The separate action of the key 7'' in conjunction with the spring 7' can be easily recognized from the showing of FIG. 2. The biasing action of the spring 7' serves to press and maintain the key 7'' in positive straddling engagement with the base portion 5 of the intermediate piece 1 so that the latter is securely retained in its associated fixing or fastening slot 2. This positive locking action cannot be diminished by the centrifugal forces occurring during operation of the fluid flow machine, so that there is absolutely insured that the locking device cannot be unintentionally released. Additionally, movement in the circumferential direction is also precluded since the nose members 8 of the key 7" snugly engage about the base portion 5 as previously explained and the spring 7' is retained in position relative to the key 7" by the tongues or flaps 9.

Figure 3:
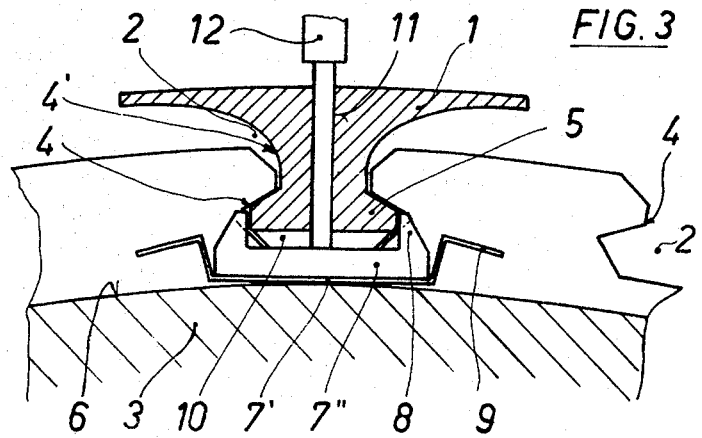
FIG. 3 is a radial sectional view corresponding to the showing of FIG. 2 but illustrating the position of the components during the assembly operation.

FIG. 3 illustrates the embodiment of FIG. 1 in a position where the various parts are in the process of being assembled together and a mounting tool 12 has been inserted into the bore 11 in the base portion 5. WIth the aid of this mounting tool 12 the key 7" is displaced against the force of the spring 7' out of the transverse groove 10, and consequently, the base portion 5 can be shifted as desired in the direction of the axial fastening slot or groove 2. The fastening device 7 thus can be mounted and dismantled in this very simple manner. As soon as in the illustrated position of the various parts the mounting tool 12 is retracted out of the bore 11 then the key 7" can engage into the transverse groove or keyway 10 in the base portion 5 of the intermediate piece or element 1. Care must be taken, however, to insure that approximately one-half of the thickness of the key 7" remains seated in the depression 6 i.e., the circumferential groove provided in the rotor 3, so that the intermediate piece 1 is positively secured against displacement along the fixing slot or groove 2 under all operating conditions.

Instead of providing the bore or hole 11 in the intermediate piece 1 it is possible to provide the base portion 5 with a groove or a similar recess through which there can be inserted a mounting tool 12 for the purpose of unlocking the fastening element 7. The mounting tool 12, without influencing the locking device of the illustrated construction, can be equipped with a wedge-shaped surface, so that the fastening element 7 can be moved into its release position already solely by virtue of the shape of the mounting tool. From the preceding discussion it should be recognized that while reference is made to the tool 12 as a mounting tool it equally serves for dismantling of the fastening device to permit, when necessary, removal of the previously secured intermediate element.

Figure 4:
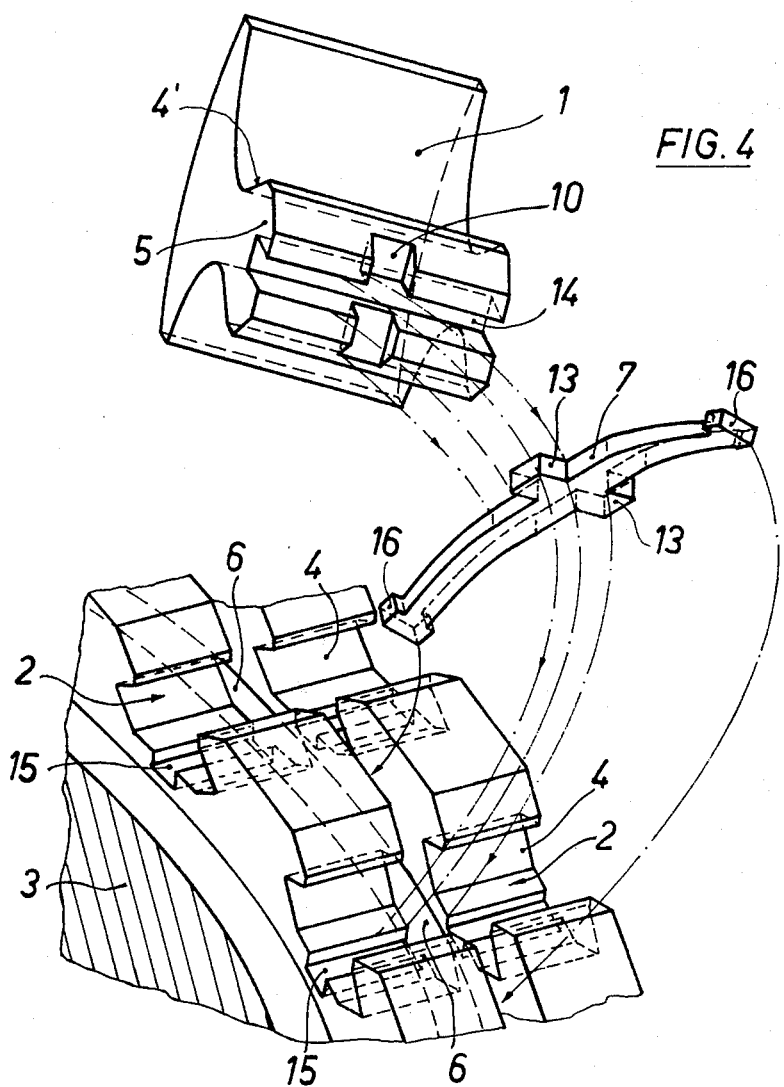
FIG. 4 is an exploded fragmentary view similar to the showing of FIG. 1 of a different exemplary embodiment of fastening element of a modified construction of locking device as contemplated by the invention.
Figure 6:
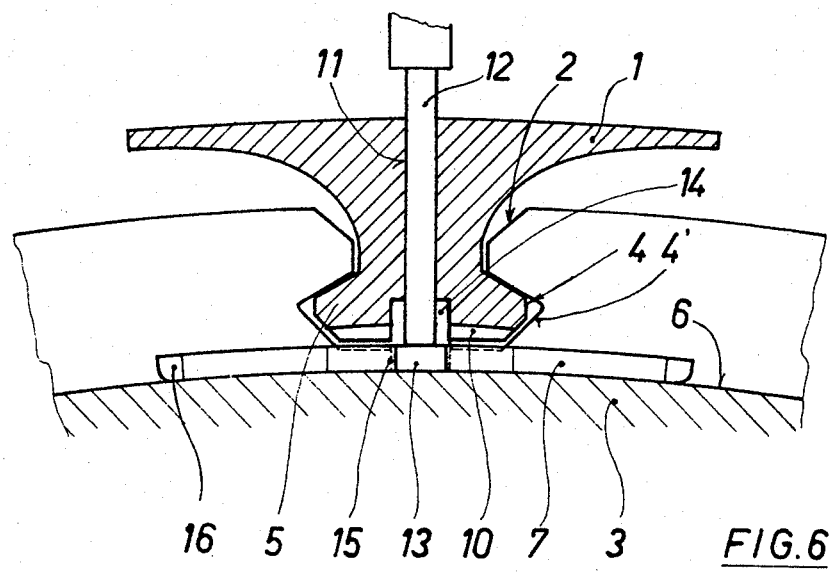
FIg. 6 is a radial sectional view, similar to the showing of FIG. 3, of the variant embodiment depicted in FIG. 4.
Figure 5:
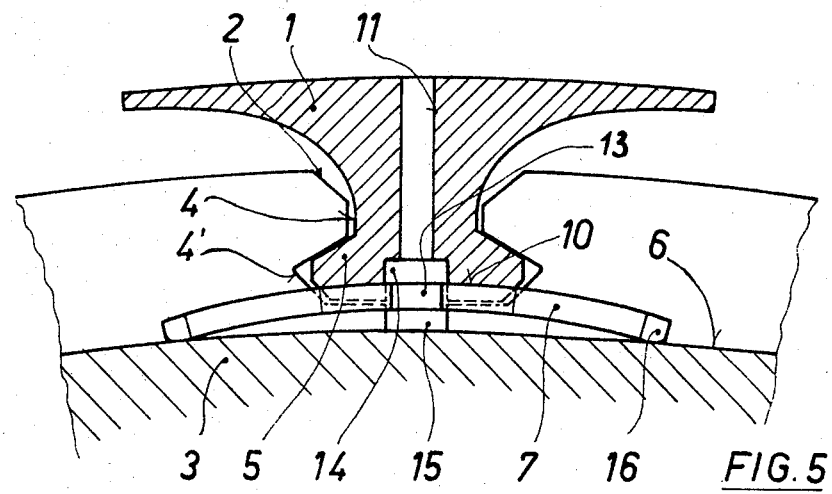
FIG. 5 is a radial sectional view, similar to the showing of FIG. 2, of the variant embodiment depicted in FIG. 4.

While in the exemplary embodiment of FIGS. 1 to 3 the fastening or securing element 7 is composed of two parts this is not an absolute necessity, and a modified version of fastening element consisting of only a one-piece construction has been shown in FIGS. 4 to 6. In this embodiment there is provided a resilient element in the form of a leaf spring 7' which simultaneously performs the locking function of the key 7" employed in the arrangement of FIG. 1, movement of the fastening element 7 in the circumferential direction, when inserted into the depression 6 of the rotor 3, being prevented by the lateral projections or protuberances 13. However, with this embodiment additional slots or grooves 14 and 15 for receiving such projections 13 must be provided at the base portion 5 of the part or piece 1 which is to be fastened, for instance a bucket, and in the axial fixing slot 2 of the rotor 3. This variant construction of fastening device furthermore has the advantage that it can be equally employed both for heat-barrier segments and for buckets or blades. Since the slot or grooves 14 extend in the axial direction of the intermediate pieces 1, each of these grooves 14 can be formed at the underside of the associated base portion 5 of the intermediate piece 1, here assumed to be a bucket, at the same time as there is formed the profile or shape of such base portion 5 and the undercut flanks 4'. The same advantages are applicable with respect to the forming of the groove 15 in the associated fixing slot or groove 2 in the rotor 3. Just as was the case for the embodiment of the FIGS. 1 to 3 here also the depression 6 i.e., the circumferentially extending groove provided in the rotor 3 at the regions of the axial fixing slots 2 divide at least the flanks 4 of each such fixing slot into approximately equal parts, and furthermore, the recesses 10 in the base portions 5 of the parts 1 to be secured coincide with the aforementioned depressions 6 in the assembled condition.

FIGS. 5 and 6 illustrate respective radial sectional views of the exemplary embodiment of spring-like fastening element 7 shown in FIG. 4. FIG. 5, analogous to the showing of FIG. 2, illustrates the various components when the intermediate part 1 has been secured by the fastening device 7 in its associated fixing slot 2, whereas FIG. 6, analogous to the showing of FIG. 3, illustrates the components during the time that the same are being assembled with the aid of the mounting tool 12 or by the same token the parts being disassembled with the aid of such mounting tool 12 should it be desired to remove the intermediate part 1 which was previously releasably mounted at the rotor. Continuing, it will be seen from the showing of FIG. 6 that into the bore 11 provided in the base portion 5 and extending continuously through the intermediate part 1 there has been inserted a spindle- or mandrel-shaped mounting tool 12 with the aid of which the fastening element 7 can be radially inwardly pressed into the depression 6 at the circumference of the rotor 3. Consequently, the fastening element 7 is released from the transverse groove or slot 10 and the projections 13 are equally released from the groove or slot 14 formed at the underside of the base portion 5. In order to permit the blade 1 to be moved along the fixing slot 2 the ends 16 of the fastening element 7 are temporarily pressed flat and slide somewhat in the circumferential direction in the depression 6. The projections 13 are thus pushed into the groove 15 of the fixing slot 2. As mentioned above, FIG. 5 shows the intermediate part 1 in its mounted and fixedly secured position.

Figure 8:
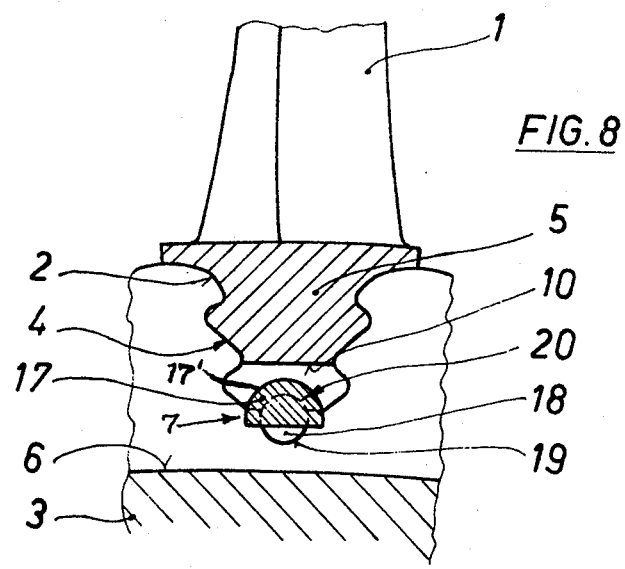
FIG. 8 is a radial sectional view of the arrangement shown in FIG. 7, taken substantially along the C—C thereof.
Figure 7:
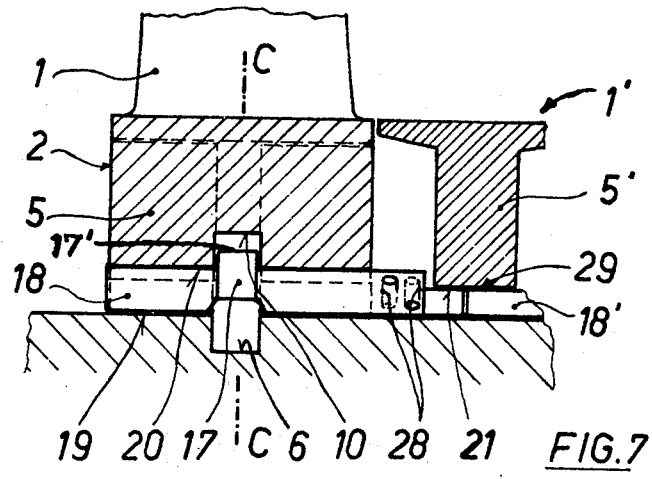
FIG. 7 illustrates a still further exemplary embodiment of locking device with a modified form of fastening element for connecting a desired part to a rotor of a fluid flow machine, the illustrated arrangement being portrayed in axial sectional view.

FIGS. 7 and 8 illustrate a further variant construction of locking device as contemplated by the invention, wherein in this case there is not employed any spring-like or resilient fastening element as was the case for the embodiments of FIGS. 1 to 3 and 4 to 6, rather there is used a purely form-locking fastening element 7. The sectional plane, taken along the line C—C of FIG. 7 passes through the central region of the width of the peripherally extending depression or slot 6. This sectional view has been shown in FIG. 8. The base portion or foot 5 of the intermediate part 1, again here assumed to be a bucket, possesses a transverse groove or slot 10 which corresponds to the circumferential depression or groove 6 and into which slot or groove 10 there engages an eccentric cam 17 provided at a pin member 18. The fastening element 7 is rotatably inserted into a groove 19 provided at the base or bottom of the associated fixing slot 2 and into a groove 20 provided in the base portion 5 and corresponding to the groove 19, one end of the pin 18 being provided with at least one flattened portion 21 and the holes or bores 28. By inserting or applying tools into the holes or bores 28 it is possible to easily bring about an appropriate rotation of the pin or pin member 18. The flattened portion 21 serves to secure the pin 18 against rotating out of the operating position. In this connection and as best seen by referring to FIG. 7 it will be recognized that the next row of parts secured to the rotor 3 are arranged such that the underside or bottom face 29 of the base portion 5' of an intermediate part 1' of the next row of parts just mentioned covers the flattened portion 21. This also affords the advantage that the next row of intermediate parts 1' cannot be inserted into their operating position of the pin member 18 has not been secured, thereby eliminating the need for an additional checking operation as concerns the integrity of the fixation. The eccentric cam 17 advantageously comprises a sector of a circle in cross-section.

Attention is now directed to FIG. 8 wherein there is shown the aforementioned radial sectional view taken substantially along the line C—C of FIG. 7. There will be clearly recognized the sector-like cross-sectional configuration of the cam 17 at the pin or pin member 18 and its engagement into the transverse groove 10 provided in the bucket base portion 5. At the bottom of the base portion 5 there is provided the groove 20 corresponding to the groove 19 of the fixing or fastening slot 2, both of the aforementioned grooves 19 and 20 forming a pivot bearing arrangement for the pin 18. The projecting surface 17' of the cam 17 secures the base portion 5 of the intermediate part or element 1 against any axial displacement. Here also, as is the case for all of the embodiments disclosed herein, the circumferential depression 6 at the region of the axial fixing slots 2 divides at least the flanks 4 of eack such fixing slot into approximately equal parts and in the assembled condition as shown for instance in FIG. 7 the transverse groove or recess 10 in the base poriton 5 of each of the parts 1 which are to be secured positionally coincide i.e. overlie the aforementioned circumferential depression 6. Equally in all of the embodiments disclosed herein the fastening elements 7 in each instance simultaneously engage in the circumferential depression 6 at the region of the fixing slot 2 and in the recesses or grooves 10 provided in the base portion 5 of the parts to be secured, and upon assembly and disassembly of such parts the fastening elements can be removed from either the circumferential depression 6 or the recesses or grooves 10.

Figure 9:
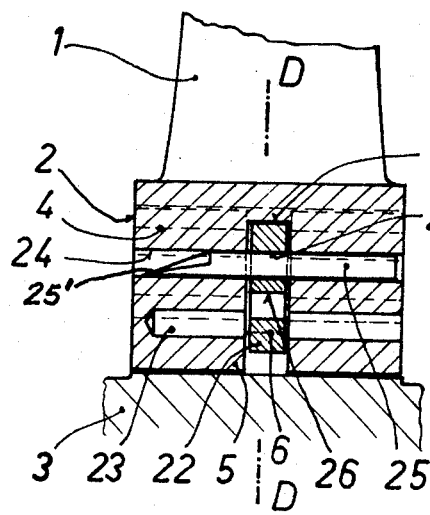
FIG. 9 is an axial sectional view of a further exemplary embodiment of the invention.
Figure 10:
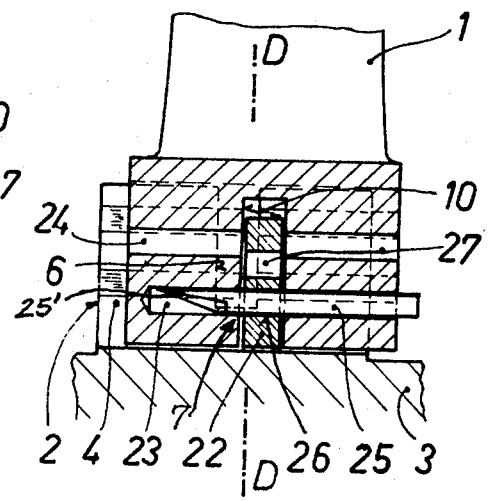
FIG. 10 is an axial sectional view similar to the showing of FIG. 9 but illustrating the various components in the assembly position.
Figure 11:
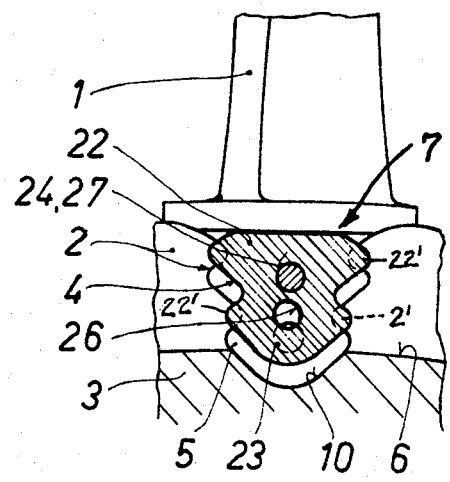
FIG. 11 is a radial section view of the exemplary embodiment shown in FIG. 9, taken substantially along the line D—D thereof.
Figure 12:
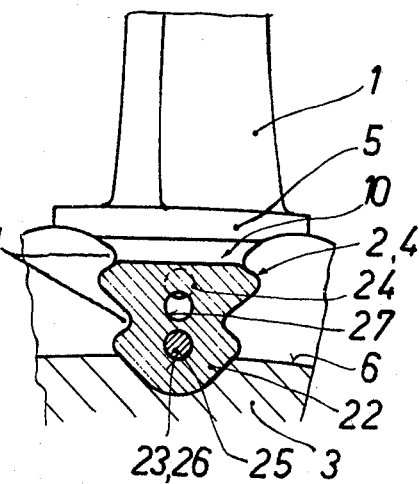
FIG. 12 is a radial sectional view similar to the showing of FIG. 11 but portraying the different parts in the assembly position.

Continuing, a further embodiment of the invention has been shown in FIGS. 9 to 12. FIGS. 9 and 10 constitute respective axial sectional views and FIGS. 11 and 12 constitute respective radial sectional views of FIGS. 9 and 10 taken substantially along the line D—D thereof. In FIGS. 9 and 11 the fastening element 7 is shown in its operating position, whereas FIGS. 10 and 12 illustrate the fastening element 7 in the mounting position. In the embodiment under discussion the fastening element 7 embodies a sliding block 22 which is inserted in the circumferential direction into a circumferentially extending transverse recess or groove 10 provided in the base portion 5 of the part to be secured, sliding block 22 also being inserted into the circumferential depression or channel 6 provided at the associated fixing slot 2. As above mentioned FIG. 10 illustrates the positional orientation of the sliding block 22 when mounting the part 1 whereas FIG. 9 shows such sliding block in operating position when such part 1 is releasably fixedly mounted at the rotor 3. This part 1 is here assumed to be constituted by a moving bucket of a fluid flow machine.

At the base portion 5 of the bucket 1 there are provided bores 23 and 24 which extend in axial direction, these bores being continuous i.e. open-ended and elevationally spaced from one another. Into one or the other of such bores 23, 24, as will be explained more fully hereinafter, there can be conveniently inserted a pin member or peg 25 or equivalent structure for selectively fixing the position of the sliding block 22. The sliding block 22 is equally provided with the axially extending continuous bores 26, 27 permitting throughpassage of the peg or pin member 25. Preparatory to releasably fixedly mounting the bucket 1 at the rotor 3 and during the assembly operation the sliding block 22 has the lowermost bore 23 in alignment with the axial bore 26 in the base portion 5 of bucket 1 and the pin member 27 has been piercingly inserted through the aligned bores 23 and 26. Consequently, the sliding block 22 is in its lowered position within the circumferentially extending transverse groove or recess 10, as best seen by referring to FIGS. 10 and 12. Now the bucket 1 with the fastening element 7 composed of sliding block 22 and pin member 25 can be axially shifted along the fixing slot 2 until the circumferential depression 6 and transverse groove or recess 10 are in alignment with one another. The pin 25 extending through the bores 23 and 26 is removed, such pin member or peg 25 now being inserted into the bores 24 and 27 as best seen by referring to FIGS. 9 and 11. The alignment of bores 24 and 27 is achieved with the aid of the pin member 25 as will be discussed more fully below.

Considering the construction of the pin member 25 in greater detail it will be seen that one end thereof is beveled or chamfered, as generally indicated by reference character 25'. Hence after the pin member 25 has been removed from the aligned bores 23 and 26 it is inserted through the bore 24 with the chamfered end 25' leading. This chamfered end as it is sliding through the axial bore 24, for instance from the right-hand side of FIG. 10 towards the left-hand side thereof, upon reaching the sliding block 22 engages, by means of the pointed chamfered end 25' of the pin member 25 the throughpassage bore 27 of such sliding block 22 and thus during further axial displacement of such pin member 25 towards the left of FIG. 9 progressively moves through the bore 27, while at the same time raising the sliding block 22 into the position shown in FIGS. 9 and 11. with the result that now the bores 24 and 27 are in alignment, pin member 25 extending through such aligned bores. Due to the just-mentioned upward shifting or raising of the sliding block 22 in the recess or groove 10 the outwardly protruding portions 22' of sliding block 22 are brought into overlapping relationship with the inwardly protruding portions 2' of the fixing slot 2 and these overlapping portions 2', 22' constitute means for preventing the base portion 5 of the part 1 which is to be secured e.g. a bucket from undesirably shifting in the axial direction. The sliding block 22 is secured against moving from the just-described locking position by the pin member or peg 25 which is seated in the aligned bores 24 and 27.

It is desirable for the pin member or peg 25 to be arranged as closely as possible to the axis of symmetry of the sliding block 22, as will be recognized from the showing of FIGS. 11 and 12. As explained above after the insertion of the part 1 axially along the fixing slot 2 into a position in which the circumferential depression 6 in the rotor 3 and the transverse recess or groove 10 in the base portion 5 exactly coincide i.e. are in alignment with one another, then the pin member 25 can be retracted from the lower bores 23 and 26 of the base portion 5 and sliding block 22 respectively, and such sliding block 22 can be shifted out of the mounting position of FIGS. 10 and 12 i.e. upwardly raised into the position shown in FIGS. 9 and 11 where such sliding block 22 partially protrudes into the circumferential depression 6 in the rotor 3, as best seen by referring to such FIGS. 9 and 11. During exchange or dismantling of the part 1 the pin member 25 is removed from the bore 24 and the through passage hole or bore 27 of the base portion 5 and sliding block 22 respectively, and again inserted into the bores 23 and 26 employed during the assembly operation. Once again the tapered end 25' of the pin member 25 upon engaging with the throughpassage bore or hole 26 facilitates shifting of the sliding block 22 back into the assembly or mounting position shown in FIGS. 10 and 12, so that the base portion 5 is again released so that it can be axially shifted.

An additional advantage of this constructional manifestation of the invention resides in the fact that the sliding block 22 and the base portion 5 of the part 1 to be secured can be simultaneously profiled or shaped, since the contours of both the sliding block 22 and the base portion 5 coincide with one another in the assembly position of the components as shown in FIGS. 10 and 12 and particularly well in the last-mentioned FIG. 12.

While there are shown and described present preferred embodiments of the invention, it is to be distinctly understood that the invention is not limited thereto, but may be otherwise variously embodied and practiced within the scope of the following claims. Accordingly,

What is claimed is:

1. A locking device for releasably fastening a part to a rotor of a fluid flow machine, the part having a base portion and the rotor having at least one axially extending fixing slot arranged at the circumference of the rotor for receiving the base portion of the part to be releasably fixed in such fixing slot, said axially extending fixing slot having bounding flank portions, said flank portions of the fixing slot engaging with the base portion of the part to prevent radial outward movement of said part, means defining a depression arranged at the region of the fixing slot, said depression subdividing the flank portions of the fixing slot into approximately two equal parts, the base portion of the part to be secured being provided with a recess extending substantially transversely with respect to the axially extending fixing slot, the recess of the part to be secured and the depression at the rotor coinciding with one another in the assembled position of the part to be fastened at the rotor, fastening means for releasably fastening the part to be secured at the rotor in said axially extending fixing slot thereof, said fastening means simultaneously engaging with the depression at the region of the axially extending fixing slot and the recess at the base portion of the part to be secured to the rotor in the assembled condition, said fastening means during both the assembly and disassembly thereof can be removed from either the depression or the recess.

2. The locking device as defined in claim 1, wherein said rotor has a plurality of such axially extending fixing slots arranged about the circumference or the rotor, each such fixing slot being subdivided by a depression and receiving therein one of the parts to be secured, each such fixing slot being further provided with one of said fastening means.

3. The locking device as defined in claim 1, wherein the depression is provided at the rotor in the form of a circumferentially extendig groove which divides each axially extending fixing slot at approximately the central region thereof.

4. The locking deivce as defined in claim 1, wherein the recess in the part to be secured to the rotor comprises a slot extending transversely with respect to the flank portions of the axially extending fixing slot, said transversely extending slot being located at the region of a lower face of the base portion of the part to be secured.

5. The locking device as defined in claim 1, wherein said fastening means comprises a key and a resilient element, said resilient element surrounding and supporting said key.

6. The locking device as defined in claim 5, wherein the resilient element comprises a spring.

7. The locking device as defined in claim 1, wherein the fastening means comprises a leaf spring provided with lateral projections, the axially extending fixing slot having an axially extending groove, the base portion of the part to be secured having an axially extending groove, said lateral projections engaging in both the axially extending groove of the axially extending fixing slot and the axially extending groove of the base portion of the part to be secured.

8. The locking device as defined in claim 1, wherein said fastening means comprises a pin member rotatable about its lengthwise axis, said pin member being provided with an eccentric cam, said axially extending fixing slot having a bottom groove and said base portion having a groove at the underside thereof, said rotatable pin member being located in said two grooves, said eccentric cam engaging with the recess and depression.

9. The locking device as defined in claim 1, wherein said fastening means comprises a sliding block displaceable in the recess of the base portion of the part to be secured, the shape of said sliding block essentially corresponding to the shape of the base portion of the part to be secured and the shape of the axially extending fixing slot, said base portion being provided with at least one pair of axially extending bores, said sliding block being provided with at least one pair of axially extending bores, one of the bores of the base portion and one of the bores of the sliding block being capable of being brought into alignment with one another and the remaining bores of the base portion and the sliding block equally being capable of being brought into alignment with one another, and a pin member selectively positionable in one or the other of the pairs of aligned bores.

10. The locking device as defined in claim 1, wherein at least the base portion of the part to be secured is provided with a bore into which there can be introduced a tool.

11. The locking device as defined in claim 10, wherein said tool is a rod-like member.

12. The locking device as defined in claim 1, wherein at least the base portion is provided with means for receiving a mounting tool.

13. The locking device as defined in claim 12, wherein said mounting tool-receiving means comprises a bore.

14. A locking device for securing a first part to a second part, said second part having a fixing slot into which there can be inserted and the first part, said first part containing a portion provided with flank means and the fixing slot having flank means engaging about the flank means of the first part to secure said first part in said fixing slot against radial outward movement, means defining a depression for subdividing the fixing slot, the first part being provided with means extending substantially transversely to the fixing slot for receiving fastening means for securing the first part to the second part, said depression being configured to receive fastening means, fastening means inserted both into the transversely extending means of the first part and the depression of the second part for releasably securing the first part to the second part, the transversely extending means of the first part when assembled in the fixing slot substantially coinciding with the depression, and wherein the fastening means during the assembly and disassembly of the first part at or from the second part respectively can be selectively removed from either the depression or the transversely extending means.

* * * * *